(12) United States Patent
Fraedrich

(10) Patent No.: US 10,983,002 B2
(45) Date of Patent: Apr. 20, 2021

(54) SPECTROMETER

(71) Applicant: ANVAJO GMBH, Dresden (DE)

(72) Inventor: Stefan Fraedrich, Dippoldiswalde (DE)

(73) Assignee: ANVAJO GMBH, Dresden (DE)

( * ) Notice: Subject to any disclaimer, the term of this patent is extended or adjusted under 35 U.S.C. 154(b) by 0 days.

(21) Appl. No.: 16/603,922

(22) PCT Filed: Apr. 9, 2018

(86) PCT No.: PCT/EP2018/058995
§ 371 (c)(1),
(2) Date: Oct. 9, 2019

(87) PCT Pub. No.: WO2018/189087
PCT Pub. Date: Oct. 18, 2018

(65) Prior Publication Data
US 2020/0041339 A1 Feb. 6, 2020

(30) Foreign Application Priority Data
Apr. 10, 2017 (DE) .................. 10 2017 206 066.2

(51) Int. Cl.
*G01J 3/02* (2006.01)
*G01J 3/18* (2006.01)
*G01J 3/28* (2006.01)

(52) U.S. Cl.
CPC ........... *G01J 3/0256* (2013.01); *G01J 3/0208* (2013.01); *G01J 3/1804* (2013.01); *G01J 3/2803* (2013.01)

(58) Field of Classification Search
USPC ........................................ 356/328
See application file for complete search history.

(56) References Cited

U.S. PATENT DOCUMENTS

| 4,300,835 A | * | 11/1981 | Schiemann | ............... | G01J 3/02 356/328 |
| 4,859,060 A | * | 8/1989 | Katagiri | ................. | G01D 5/266 356/454 |

(Continued)

FOREIGN PATENT DOCUMENTS

| CN | 104062007 | 9/2014 |
| CN | 105318967 | 2/2016 |

(Continued)

OTHER PUBLICATIONS

Hossain et al. Optical fiber smartphone spectrometer. Optics Letter, vo. 41, No. 10, May 15, 2016, p. 2237.

(Continued)

*Primary Examiner* — Tarifur R Chowdhury
*Assistant Examiner* — Omar H Nixon
(74) *Attorney, Agent, or Firm* — Jacobson Holman PLLC

(57) ABSTRACT

The invention relates to a spectrometer comprising a housing (11) equipped with a planar optical grating (2), which is arranged opposite an aperture (1) of the housing (11) and which is aligned at an angle of less than 45° to a normal of the aperture (1), a lens assembly (6), and a sensor element (7). The aperture (1) is dimensioned such that electromagnetic radiation incident parallel to the normal of the aperture (1) completely irradiates the surface of the optical grating (2). The lens assembly (6) is arranged between the optical grating (2) and the sensor element (7) in order to focus the electromagnetic radiation onto the sensor element (7) such that solely a first order of diffraction or higher orders of diffraction of the electromagnetic radiation diffracted by the optical grating (2) is directed towards the lens assembly (6) and the sensor element (7).

16 Claims, 2 Drawing Sheets

(56) References Cited

U.S. PATENT DOCUMENTS

| | | | | |
|---|---|---|---|---|
| 5,373,359 | A * | 12/1994 | Woollam | G01J 3/36 |
| | | | | 356/328 |
| 6,424,416 | B1 * | 7/2002 | Gross | G01J 3/02 |
| | | | | 356/326 |
| 6,870,619 | B1 | 3/2005 | Tenhunen et al. | |
| 2005/0180013 | A1 * | 8/2005 | Heidemann | G02B 27/4244 |
| | | | | 359/566 |
| 2006/0033911 | A1 * | 2/2006 | Brown | G01N 21/474 |
| | | | | 356/326 |
| 2012/0026496 | A1 * | 2/2012 | Silny | G01J 3/2803 |
| | | | | 356/328 |
| 2012/0018854 | A1 | 7/2012 | Demmer et al. | |
| 2012/0188541 | A1 * | 7/2012 | Demmer | G01J 3/18 |
| | | | | 356/326 |
| 2013/0294727 | A1 * | 11/2013 | Ko | G01J 3/18 |
| | | | | 385/37 |
| 2014/0118738 | A1 * | 5/2014 | Comstock, II | G01J 3/24 |
| | | | | 356/328 |

FOREIGN PATENT DOCUMENTS

| | | |
|---|---|---|
| DE | 102012210954 | 1/2014 |
| DE | 20202015006402 | 11/2015 |
| FR | 2852694 | 9/2004 |

OTHER PUBLICATIONS

Steinich et al. Optical design of camera optics for mobile phones. Advanced Optical Technology, vol. 1, Mar. 1, 2012, pp. 51-58.

* cited by examiner

SPECTROMETER

The present invention relates to spectrometer.

Various spectrometers in which miniaturization of the entire setup is to be achieved are known from the prior art. For example, U.S. Pat. No. 6,870,619 B1 discloses a miniaturized spectrometer having only few optical elements. However, this setup requires a costly curved optical grating, a small aperture and electro-optical modulators. When using a large number of optical elements upstream of the optical grating, such as mirrors or lenses, scattered light is a major problem. Therefore, in document US 2012 0188542 A1, a second aperture downstream of an entry aperture is used to delimit an incident beam. However, this likewise limits a sensitivity of the spectrometer.

The present invention is therefore based on the object of proposing a spectrometer that avoids the stated disadvantages, that is to say with which a miniaturized construction with a high sensitivity can be attained with as few optical elements as possible.

This object is achieved according to the invention by a spectrometer as per claim 1. Advantageous refinements and developments are described in the dependent claims.

A spectrometer has a housing, in which a planar optical grating that is arranged opposite an aperture of the housing, an objective arrangement and a sensor element are arranged. The optical grating is aligned at an angle of less than 45° with respect to a normal of the aperture. The aperture is dimensioned such that the surface of the optical grating is completely irradiated in the case of electromagnetic radiation that is incident parallel to the normal of the aperture. For focusing the incident electromagnetic radiation onto the sensor element, the objective arrangement is arranged between the optical grating and the sensor element such that only a first order of diffraction or higher orders of diffraction of the electromagnetic radiation that is diffracted by the optical grating is/are directed onto the objective arrangement and the sensor element.

By using a planar, that is to say plane, optical grating, the structural part can be designed and installed easily. Because of the relatively large aperture, the dimensions of which are selected precisely such that no point source is obtained, the entire spectrometer is highly sensitive, since much electromagnetic radiation is incident on the optical grating. This is supported further by an acute angle, which also facilitates a compact construction of the entire spectrometer. Entirely irradiating the optical grating is here in particular to be understood to mean that the entire surface of the optical grating that faces the aperture is irradiated by the incident electromagnetic radiation. The angle can here be understood to be aligned starting from a surface of the planar optical grating to the normal of the aperture as a second angle leg and from the normal of the aperture to the surface of the planar optical grating.

The incident electromagnetic radiation typically passes from the aperture directly onto the optical grating. Since no further optical elements, such as mirrors or a further aperture, need be traversed, the entire construction is simple and compact, and little scattered light is generated.

The aperture can have a diameter or a width of at least between 0.5 mm and 2.5 mm. The diameter or the width is preferably 1 mm. The aperture itself can be a rectangular, in particular square, or a round opening in the housing. This allows as much electromagnetic radiation as possible to be captured with a relatively large aperture.

The angle at which the optical grating is aligned in relation to the normal can be between 5° and 15°, preferably between 7° and 10°, with particular preference 7.5°, to make a flat construction possible and to keep the space requirement low.

A distance between the aperture and the optical grating is typically between 1 mm and 40 mm, preferably between 10 mm and 30 mm, with particular preference 20 mm, with the result that the spectrometer has a correspondingly compact size.

Provision may be made for the optical grating to be provided with a coating that reflects at least 90%, preferably at least 95%, with particular preference at least 99%, of the incident electromagnetic radiation so as to achieve a sufficiently high intensity on the sensor element. The coating preferably comprises aluminum or is made from aluminum.

The objective arrangement can have at least two focusing lenses to ensure reliable setting of the focal point.

A focal length of the objective arrangement is typically between 1 mm and 4 mm, preferably 2 mm.

The sensor element can be a photodiode line array or a CCD line array (charge-coupled device) or an image sensor, for example a CMOS sensor (complementary metal-oxide semiconductor) or a CCD sensor.

The sensor element is typically sensitive to electromagnetic radiation in the visible wavelength range of between 380 nm and 780 nm. Alternatively or in addition thereto, the sensor element can also be sensitive to electromagnetic radiation in the infrared wavelength range, in particular to wavelengths of between 780 nm and 1700 nm, or in the ultraviolet wavelength range, in particular to wavelengths of between 200 nm and 380 nm. However, a grating period of the optical grating and/or an angle of tilt is/are typically adapted in dependence on the wavelength that is to be detected.

Preferably, a cell phone has the spectrometer described. In this case, the cell phone can have the described spectrometer integrated into a housing of the cell phone, or the spectrometer can be placed onto the cell phone.

Exemplary embodiments of the spectrometer are illustrated in the drawings and will be described below with reference to FIGS. 1 and 2.

Figure 1:
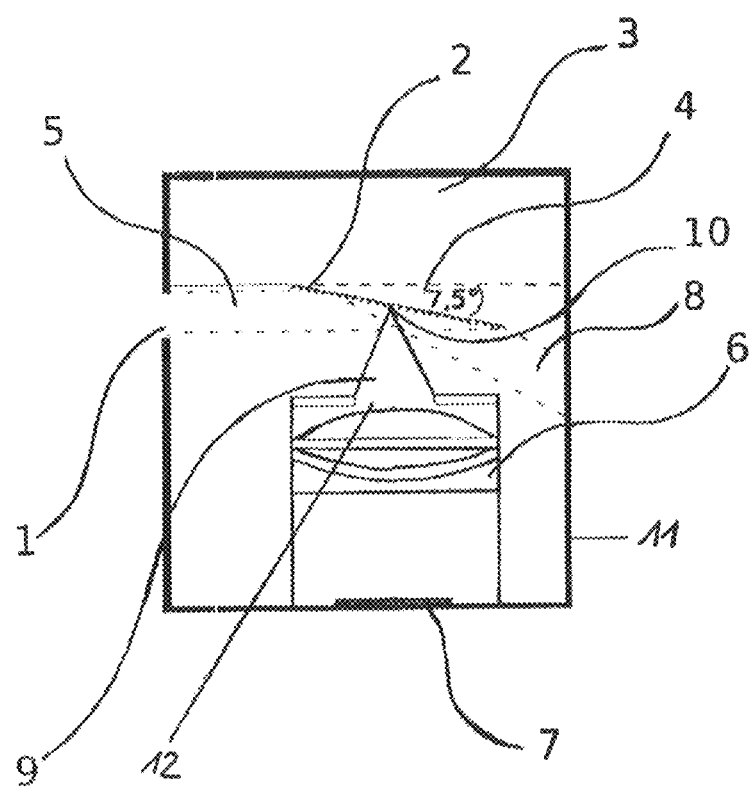
FIG. 1 shows a schematic side view of the spectrometer.

FIG. 1 illustrates a schematic side view of the spectrometer. A beam 5 of electromagnetic radiation in the visible wavelength range falls through an aperture 1 into an interior space 3 of a housing 11 of the spectrometer, which housing consists of plastic or metal.

The aperture 1 in the illustrated exemplary embodiment is round and has a diameter of 1 mm, with the result that no point source is produced by the aperture 1 at the entrance of the spectrometer. Due to the size of the aperture 1, the spectrometer is thus highly sensitive because there is a quadratic relationship between the size of the area of the aperture 1 and the incident radiation intensity or light intensity.

From the aperture 1, the electromagnetic radiation falls onto an optical grating 2 having a grating constant of between 200 nm and 1200 nm, preferably between 400 nm and 700 nm, which grating is mounted on the housing 11 by way of a holder. Since no further optical elements are arranged in the beam path of the electromagnetic radiation, the formation of scattered light is minimized and no further aperture is necessary. The optical grating 2 in the illustrated exemplary embodiment is tilted at a flat angle 4 of 7.5° with respect to the propagation direction of the electromagnetic radiation which is directed parallel to a normal of the aperture 1. The distance between the aperture 1 and the optical grating 2 is 20 mm.

The aperture 1 is dimensioned such that the surface of the optical grating 2 that faces the aperture 1 is completely irradiated in the case of electromagnetic radiation that is incident parallel to the normal of the aperture 1. As a result, the optical grating 2 can have at least the size of a diameter of the incident beam 5 which falls through the aperture 1, though an area of the optical grating 2 can also be smaller than the beam 5.

The optical grating 2 is provided, as a reflection diffraction grating, with a highly reflective aluminum coating that reflects at least 90% of an incident intensity. The tilt angle 4 of the optical grating 2 is fixed by the Bragg condition and is dependent on the grating period of the optical grating 2 and the wavelength range of the incident electromagnetic radiation.

Said incident electromagnetic radiation is reflected differentiated in an angle region by the optical grating 2 such that the first order of diffraction 9 is incident on an objective arrangement 6 composed of two planoconvex lenses.

This objective arrangement 6 is arranged at an angle of 90° with respect to the propagation direction of the electromagnetic radiation. The zero order of diffraction 8 is not incident on the objective arrangement 6, but onto an internal wall of the housing 11 in the interior space 3. A focal point 10 of the objective arrangement 6 is located, on one side of the objective arrangement 6, on the surface of the optical grating 2 and, on the other side, on an image sensor 7. The objective arrangement 6 is provided with a second aperture 12 so as to prevent scattered light from reaching the image sensor 7. The second aperture has a diameter or width of between 1 mm and 10 mm. The focal length of the objective arrangement 6 in the exemplary embodiment illustrated is 2 mm. This can lead to image distortion, but this can be corrected by an evaluation unit to which the image sensor 7 is electrically connected. However, the focal length should be chosen such that the zero order of diffraction 8 is not incident on the objective arrangement 6 under any circumstances.

The objective arrangement 6 is adapted to the size of the image sensor 7, so that the entire spectrum that is to be analyzed can be imaged over the complete extent of the image sensor 7. The smaller the image sensor 7 is, the greater is the so-called crop factor or format factor that is to be chosen, which indicates a length ratio between the diagonals of two recording formats, and the smaller the objective arrangement 6 can be. A pixel size is typically 13 µm in the image sensor 7 (but can also be up to 6 µm in other embodiments); if a photodiode line array is used instead of the image sensor 7, the pixel size can be 5.5 µm. In order to satisfy the Nyquist condition, a correspondingly high number of pixels must be present.

With the arrangement, which is described above and illustrated in FIG. 1, it is possible for a spectral resolution to be only 1 nm despite an aperture diameter of 1 mm.

Figure 2:
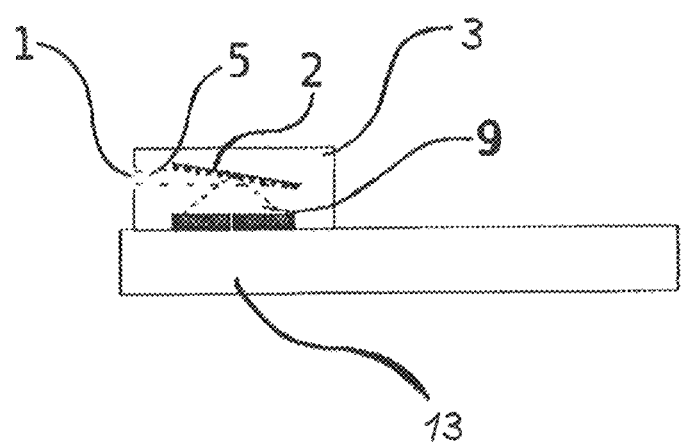
FIG. 2 shows a cell phone in side view with the spectrometer.

FIG. 2 illustrates a schematic side view of a cell phone 13, more specifically a smartphone, which has the described spectrometer. Recurring features in this figure are designated with identical reference signs as in the previous figure. The objective arrangement 6 and the image sensor 7 can be implemented here by way of a camera which is already installed in the cell phone 13. The evaluation unit is typically arranged in the cell phone 13, and a display of the cell phone serves as the output unit of the spectrometer on which the data that have been ascertained by the evaluation unit are reproduced. In the exemplary embodiment illustrated in FIG. 2, the spectrometer with its housing 12 is placed onto the cell phone 13, but it is also possible to integrate the spectrometer into the cell phone 13 such that a housing of the cell phone 13 also encloses the spectrometer.

The invention claimed is:

1. A spectrometer having a housing, in which a planar optical grating that is arranged opposite an aperture of the housing and is aligned at an angle of less than 45° with respect to a normal of the aperture, an objective arrangement and a sensor element are arranged, wherein
   the aperture is dimensioned such that the surface of the optical grating is completely irradiated in the case of electromagnetic radiation that is incident parallel to the normal of the aperture, wherein
   for focusing the electromagnetic radiation onto the sensor element, the objective arrangement is arranged between the optical grating and the sensor element such that
   only a first order of diffraction or higher orders of diffraction of the electromagnetic radiation that is diffracted by the optical grating is/are directed onto the objective arrangement and the sensor element.

2. The spectrometer as claimed in claim 1, characterized in that the incident electromagnetic radiation passes from the aperture directly onto the optical grating.

3. The spectrometer as claimed in claim 1, characterized in that the aperture has a diameter or a width of at least between 0.5 mm and 2.5 mm.

4. The spectrometer as claimed in claim 3, characterized in that the aperture has a diameter or a width of 1 mm.

5. The spectrometer as claimed in claim 1, characterized in that the angle at which the optical grating is aligned in relation to the normal is between 5° and 15°.

6. The spectrometer as claimed in claim 5, characterized in that the angle at which the optical grating is aligned in relation to the normal is between 7° and 10°.

7. The spectrometer as claimed in claim 6, characterized in that the angle at which the optical grating is aligned in relation to the normal 7.5°.

8. The spectrometer as claimed in claim 1, characterized in that a distance between the aperture and the optical grating of between 1 mm and 40 mm is observed.

9. The spectrometer as claimed in claim 8, characterized in that a distance between the aperture and the optical grating of between 10 mm and 30 mm is observed.

10. The spectrometer as claimed in claim 9, characterized in that a distance between the aperture and the optical grating of 20 mm is observed.

11. The spectrometer as claimed in claim 1, characterized in that the optical grating is provided with a coating that reflects at least 90% of the incident electromagnetic radiation.

12. The spectrometer as claimed in claim 1, characterized in that the objective arrangement has at least two focusing lenses.

13. The spectrometer as claimed in claim 1, characterized in that the objective arrangement has a focal length of between 1 mm and 4 mm.

14. The spectrometer as claimed in claim 13, characterized in that the objective arrangement has a focal length of 2 mm.

15. The spectrometer as claimed in claim 1, characterized in that the sensor element is a photodiode line array or an image sensor.

16. A cell phone having a spectrometer as claimed in claim 1.

\* \* \* \* \*